United States Patent
Zhang et al.

(10) Patent No.: US 8,885,765 B2
(45) Date of Patent: Nov. 11, 2014

(54) METHOD AND A USER TERMINAL FOR PROCESSING DIGITAL PREDISTORTION

(71) Applicant: Huawei Technologies Co., Ltd., Guangdong (CN)

(72) Inventors: Qiang Zhang, Shanghai (CN); Dongsheng Liu, Shanghai (CN); Gengshi Wu, Shanghai (CN); Jing Yang, Shanghai (CN); Yukuang Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/775,521

(22) Filed: Feb. 25, 2013

(65) Prior Publication Data

US 2013/0287140 A1 Oct. 31, 2013

(30) Foreign Application Priority Data

Feb. 24, 2012 (CN) .......................... 2012 1 0044243

(51) Int. Cl.
*H04K 1/02* (2006.01)
*H04L 25/03* (2006.01)
*H04L 25/49* (2006.01)
*H04L 27/36* (2006.01)

(52) U.S. Cl.
CPC .................................. *H04L 27/367* (2013.01)
USPC ...................................................... 375/296

(58) Field of Classification Search
USPC ........................................................ 375/296
See application file for complete search history.

(56) References Cited

U.S. PATENT DOCUMENTS

| 7,577,408 | B2 | 8/2009 | Mueller et al. |
| 2006/0209984 | A1* | 9/2006 | Kenington ................... 375/297 |
| 2011/0261903 | A1* | 10/2011 | O'Brien et al. ............... 375/297 |

FOREIGN PATENT DOCUMENTS

| CN | 101207592 A | 6/2008 |
| EP | 1672783 A1 | 6/2006 |

OTHER PUBLICATIONS

Shannon, Claude E.; "A Mathematical Theory of Communication," Bell System Technical Journal 27 (3): 379-423, Jul./Oct. 1948.*
Zhu, et al., "Digital Predistortion for Envelope-Tracking Power Amplifiers Using Decomposed Piecewise Volterra Series," Oct. 2008, IEEE, New York, New York.

* cited by examiner

*Primary Examiner* — Michael Neff
*Assistant Examiner* — Nader Bolourchi
(74) *Attorney, Agent, or Firm* — Huawei Technologies Co., Ltd.

(57) ABSTRACT

Embodiments of the present invention provide a digital predistortion processing method and a user terminal, which relate to the field of communications, and can simplify the structure of a digital predistortion apparatus and reduce the cost. The method includes: setting a control command; and tuning, when the control command is selecting a data collection mode as the working mode of a receive channel, the frequency of a local oscillator and the central frequency of a band-pass filter in the receive channel to the transmitting frequency of the user terminal, so that the user terminal performs predistortion factor update. The embodiments of the present invention are applied to the user terminal for digital predistortion processing.

12 Claims, 3 Drawing Sheets

METHOD AND A USER TERMINAL FOR PROCESSING DIGITAL PREDISTORTION

CROSS-REFERENCE TO RELATED APPLICATIONS

This application claims priority to Chinese Patent Application No. 201210044243.6, filed on Feb. 24, 2012, which is hereby incorporated by reference in its entirety.

FIELD OF THE INVENTION

The present invention relates to the field of communications, and in particular to a digital predistortion processing method and a user terminal.

BACKGROUND OF THE INVENTION

A power amplifier is an indispensable component in a communications system. The power amplifier itself is a non-linear system. An efficiency and a linearity of the power amplifier are inversely proportional; that is, higher efficiency of the power amplifier indicates its lower linearity or higher nonlinearity. From the perspective of energy conversion, the system requires a high-efficiency power amplifier, and at this time the nonlinearity of the power amplifier is extremely high. This causes nonlinear distortion of the power amplifier. The nonlinear distortion of the power amplifier will cause an ACLR (Adjacent Channel Leakage Ratio) of a transmitted signal to exceed the range specified in a 3GPP (The 3rd Generation Partnership Project) protocol. Serious nonlinear distortion may even cause in-band signal distortion, and finally cause an increased error code rate in the system. This requires that digital predistortion processing be performed for signals with nonlinear distortion caused by the power amplifier, so that the ACLR of a signal output by the power amplifier meets the requirement in the 3GPP protocol.

In an existing digital predistortion implementation solution, an independent dedicated chain for collecting data output by the power amplifier is required, where the chain includes a BPF (Band Pass Filter), an LO (Local Oscillator), an LPF (Low Pass Filter), and the like. Meanwhile, the dedicated chain for collecting data output by the power amplifier cannot introduce new nonlinear distortion. Otherwise, a predistortion factor calculated by an adaptive factor updating module will include the nonlinearity of the dedicated chain for collecting data output by the power amplifier, which causes that a predistorter cannot properly compensate for the nonlinearity of a transmit chain. This poses a higher requirement for the dedicated chain for collecting data output by the power amplifier, and a series of functions, such as eliminating a residual frequency deviation and correcting a sampling deviation, needs to be added. This finally causes complex and costly circuits in implementation of the dedicated chain for collecting data output by the power amplifier.

SUMMARY OF THE INVENTION

Embodiments of the present invention provide a digital predistortion processing method and a user terminal to simplify the structure of a digital predistortion apparatus and reduce the cost.

To achieve the preceding objectives, the embodiments of the present invention adopt the following technical solutions:

A digital predistortion processing method includes: setting a control command; and tuning a frequency of a local oscillator and a central frequency of a band-pass filter in a receive chain to a transmitting frequency of a user terminal, so that the user terminal performs predistortion factor update, if the control command is selecting a data collection mode as a working mode of the receive chain.

A user terminal includes: a setting unit, configured to set a control command; and a frequency tuning unit, configured to tune a frequency of a local oscillator and a central frequency of a band-pass filter in a receive chain to a transmitting frequency of a user terminal, so that the user terminal performs predistortion factor update, when the control command is selecting a data collection mode as a working mode of a receive chain.

According to the digital predistortion processing method and the user terminal provided in the embodiments of the present invention, a control command is set, and when the control command is selecting a data collection mode as the working mode of a receive chain, the frequency of a local oscillator and the central frequency of a band-pass filter in the receive chain are tuned to the transmitting frequency of the user terminal, so that the user terminal performs predistortion factor update. In this way, an existing receive chain of the user terminal may be used to implement the digital predistortion processing, thereby simplifying the structure of a digital predistortion apparatus and reducing the cost.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following descriptions merely show some embodiments of the present invention, and persons of ordinary skill in the art can derive other drawings from the accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
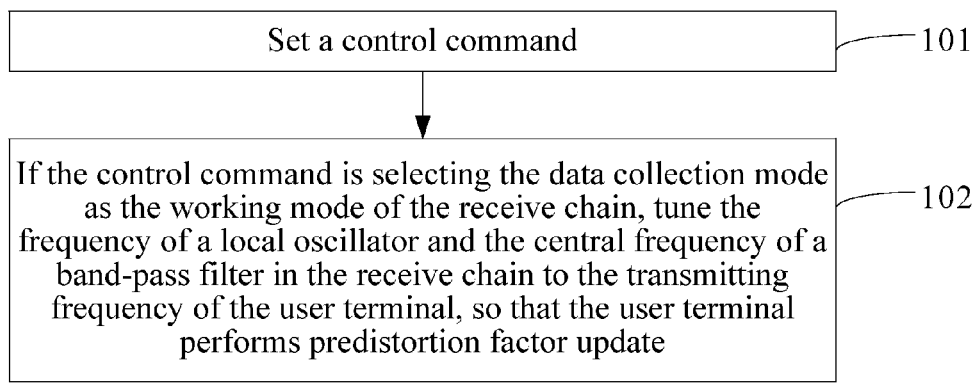
FIG. 1 is schematic flow chart of a digital predistortion processing method according to Embodiment 1.
Figure 2:
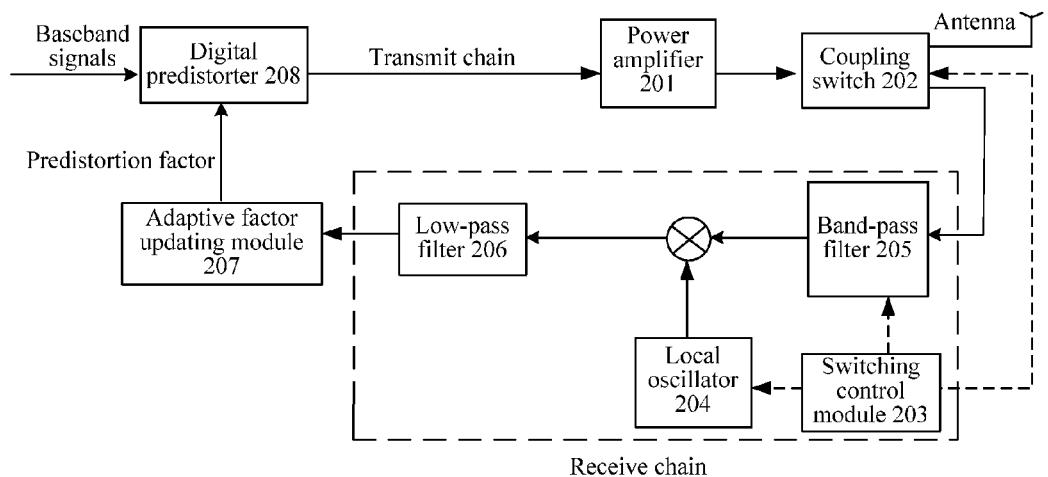
FIG. 2 is a schematic diagram of a method for implementing digital predistortion processing according to the present invention.

This embodiment provides a digital predistortion processing method. As shown in FIG. 2, the method includes the following steps:

101. Set a control command.

When a user terminal is performing digital predistortion processing, a predistortion factor in a digital predistorter of the user terminal needs to be constantly updated. Updating the predistortion factor requires that baseband signals be collected for an adaptive factor updating module of the user terminal. In this embodiment, we use an existing receive chain of the user terminal to collect the baseband signals.

The user terminal sets the control command, where the control command may instruct the receive chain of the user terminal to enter a data collection mode.

102. If the control command is selecting the data collection mode as the working mode of the receive chain, tune the frequency of a local oscillator and the central frequency of a band-pass filter in the receive chain to the transmitting frequency of the user terminal, so that the user terminal performs predistortion factor update.

If the control command is selecting the data collection mode as the working mode of the receive chain, the receive chain enters a data collection state, and the frequency of the local oscillator and the central frequency of the band-pass filter in the receive chain are tuned to the transmitting frequency of the user terminal.

Specifically, as shown in FIG. 2, original baseband signals sent by the user terminal are converted into radio frequency signals after traveling through a transmit chain and a power amplifier 201. When a switching control module 203 of the user terminal sets the control command into selecting the data collection mode as the working mode of the receive chain, that is, the radio frequency signals is sent, under the effects of a coupling switch 202, to the receive chain of the user terminal, and in the meanwhile, the switching control module 203 tunes the frequency of a local oscillator 204 and the central frequency of a band-pass filter 205 in the receive chain to the transmitting frequency of the user terminal, partial interference signals of the radio frequency signals may be removed by the band-pass filter 205 whose central frequency is the transmitting frequency of the user terminal. Then the radio frequency signals can be converted into baseband signals after going through the effects of the local oscillator 204 whose frequency is the transmitting frequency of the user terminal and a low-pass filter 206. Then the baseband signals are sent to an adaptive factor updating module 207. The adaptive factor updating module 207 may calculate the predistortion factor according to the baseband signals and the original baseband signals sent by the user terminal, and send the predistortion factor to a digital predistorter 208, so that the digital predistorter performs the predistortion factor update.

According to the digital predistortion processing method provided in this embodiment, a control command is set, and when the control command is selecting a data collection mode as the working mode of a receive chain, the frequency of a local oscillator and the central frequency of a band-pass filter in the receive chain are tuned to the transmitting frequency of the user terminal, so that the user terminal performs predistortion factor update. In this way, an existing receive chain of the user terminal may be used to implement the digital predistortion processing, thereby simplifying the structure of a digital predistortion apparatus and reducing the cost.

Embodiment 2

Figure 3:
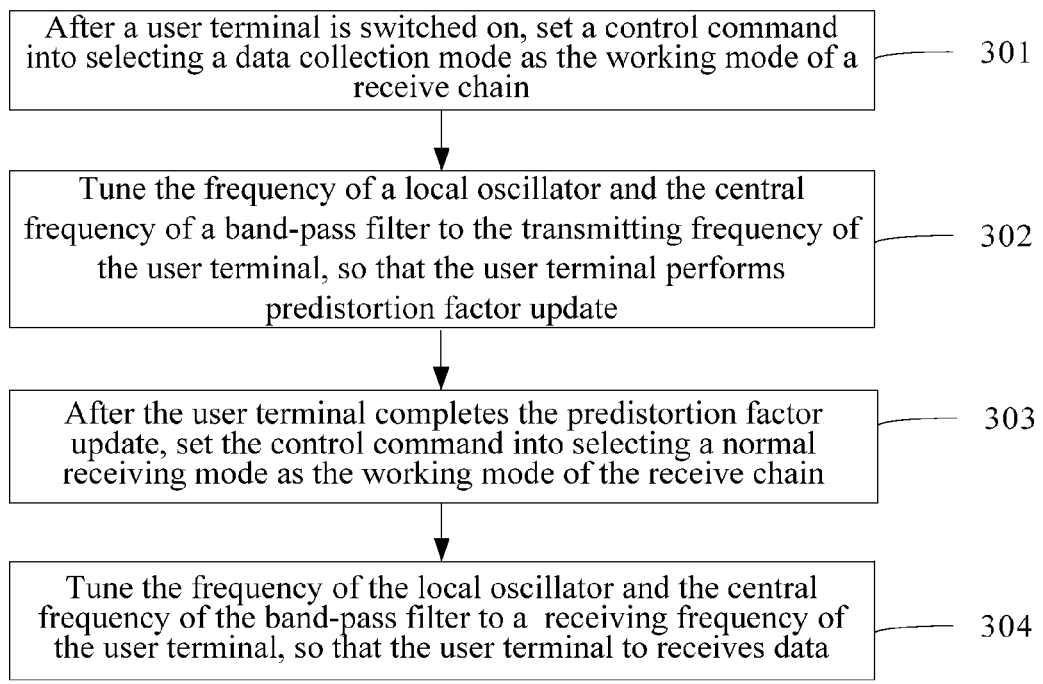
FIG. 3 is schematic flow chart of a digital predistortion processing method according to Embodiment 2.

This embodiment provides a digital predistortion processing method. As shown in FIG. 3, the method includes the following steps:

301. After a user terminal is switched on, set a control command into selecting a data collection mode as the working mode of a receive chain.

After the user terminal is just switched on, a predistortion factor in a digital predistorter may be updated, so that the user terminal performs predistortion processing. Updating the predistortion factor requires that baseband signals be collected for an adaptive factor updating module of the user terminal. In this embodiment, we use an existing receive chain of the user terminal to collect the baseband signals.

After the user terminal is just switched on, the control command may be immediately set into selecting the data collection mode as the working mode of the receive channel chain.

302. Tune the frequency of a local oscillator and the central frequency of a band-pass filter in the receive chain to the transmitting frequency of the user terminal, so that the user terminal performs predistortion factor update.

The data collection mode is selected as the working mode of the receive chain, then the receive chain enters a data collection state, and the frequency of the local oscillator and the central frequency of the band-pass filter in the receive chain are tuned to the transmitting frequency of the user terminal.

Specifically, as shown in FIG. 2, original baseband signals sent by the user terminal are converted into radio frequency signals after traveling through a transmit chain and a power amplifier 201. When a switching control module 203 of the user terminal sets the control command into selecting the data collection mode as the working mode of the receive chain, that is, the radio frequency signals is sent, under the effects of a coupling switch 202, to the receive chain of the user terminal, and in the meanwhile, the switching control module 203 tunes the frequency of a local oscillator 204 and the central frequency of a band-pass filter 205 in the receive chain to the transmitting frequency of the user terminal, partial interference signals of the radio frequency signals may be removed by the band-pass filter 205 whose central frequency is the transmitting frequency of the user terminal. Then the radio frequency signals can be converted into baseband signals after going through the effects of the local oscillator 204 whose frequency is the transmitting frequency of the user terminal and a low-pass filter 206. Then the baseband signals are sent to an adaptive factor updating module 207. The adaptive factor updating module 207 may calculate the predistortion factor according to the baseband signals and the original baseband signals sent by the user terminal, and send the predistortion factor to a digital predistorter 208, so that the digital predistorter performs the predistortion factor update.

303. After the user terminal completes the predistortion factor update, set the control command into selecting a normal receiving mode as the working mode of the receive chain.

After the predistorter completes the predistortion factor update, the user terminal sets the control command into selecting the normal receiving mode as the working mode of the receive chain.

304. Tune the frequency of the local oscillator and the central frequency of the band-pass filter in the receive chain to a receiving frequency of the user terminal, so that the user terminal receives data.

At this time the normal receiving mode is selected as the working mode of the receive chain, the receive chain enters a normal receiving state, the original baseband signals sent by the user terminal are converted into radio frequency signals after traveling through the transmit chain and the power amplifier 201, and the radio frequency signals are sent to an antenna under the effects of the coupling switch 202 and then are transmitted. Meanwhile, the coupling switch 202 functions on the switching control module 203, so that the switching control module 203 tunes the frequency of the local oscillator 204 and the central frequency of the band-pass filter 205 in the receive chain to the receiving frequency of the user terminal, and so that the user terminal receives data normally.

Optionally, when the user terminal is in a switched-on state and the receive chain of the user terminal is idle, the user terminal may periodically set the control command into selecting the data collection mode as the working mode of the receive chain, and set, after the user terminal completes the predistortion factor update, the control command into selecting the normal receiving mode as the working mode of the receive chain; that is, steps 301-304 are performed periodically. The specific process is described in detail in the foregoing, and will not be described herein again.

In this embodiment, the receive chain enters the data collection mode only in a particular scenario, and remains in this mode only for a short period of time, having no impact on current services of the user terminal.

The method descried in this embodiment may apply to predistortion processing on the side of a user terminal in a WCDMA (Wideband Code Division Multiple Access) system, CDMA (Code Division Multiple Access) system, and GSM (Global System for Mobile Communications). For a TD-SCDMA (Time Division-Synchronous Code Division Multiple Access) system, the receive chain and the transmit chain use the same frequency in practical applications, and therefore, when the receive chain enters the data collection mode, the frequency of the local oscillator and the central frequency of the band-pass filter in the receive chain are already the transmitting frequency of the user terminal, and do not need to be adjusted.

According to the digital predistortion processing method provided in this embodiment, a control command is set, and then a user terminal tunes, when the control command is set into selecting a data collection mode as the working mode of a receive chain in a particular scenario, the frequency of a local oscillator and the central frequency of a band-pass filter in the receive chain to the transmitting frequency of the user terminal, so that the user terminal performs predistortion factor update. In this way, an existing receive chain of the user terminal may be used in the particular scenario to implement digital predistortion processing, thereby simplifying the structure of a digital predistortion apparatus and reducing the cost under the condition that current services of the user terminal are not affected.

Embodiment 3

Figure 4:
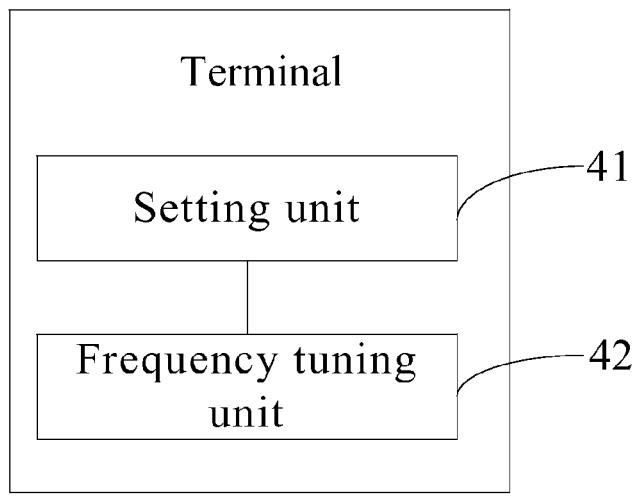
FIG. 4 is a user terminal according to Embodiment 3.

This embodiment provides a user terminal. As shown in FIG. 4, the user terminal includes a setting unit 41 and a frequency tuning unit 42.

The setting unit 41 is configured to set a control command.

When the user terminal is performing digital predistortion processing, a predistortion factor in a digital predistorter of the user terminal needs to be constantly updated. Updating the predistortion factor requires that baseband signals be collected for an adaptive factor updating module of the user terminal. In this embodiment, we use an existing receive chain of the user terminal to collect the baseband signals.

The setting unit 41 of the user terminal sets the control command, where the control command may instruct the receive chain of the user terminal to enter a data collection mode.

There may be the following two scenarios in which the control command is set:

Scenario 1: The user terminal is just switched on.

After the user terminal is switched on, the setting unit 41 sets the control command into selecting the data collection mode as the working mode of the receive chain, and sets, after the user terminal completes predistortion factor update, the control command into selecting a normal receiving mode as the working mode of the receive chain.

Scenario 2: The receive chain of the user terminal in a switched-on state is idle.

When the receive chain of the user terminal in the switched-on state is idle, the setting unit 41 periodically sets the control command into selecting the data collection mode as the working mode of the receive chain, and sets, after the user terminal completes the predistortion factor update, the control command into selecting the normal receiving mode as the working mode of the receive chain.

The frequency tuning unit 42 is configured to tune, when the control command is selecting the data collection mode as the working mode of the receive chain, the frequency of a local oscillator and the central frequency of a band-pass filter in the receive chain to the transmitting frequency of the user terminal, so that the user terminal performs the predistortion factor update.

Figure 5:
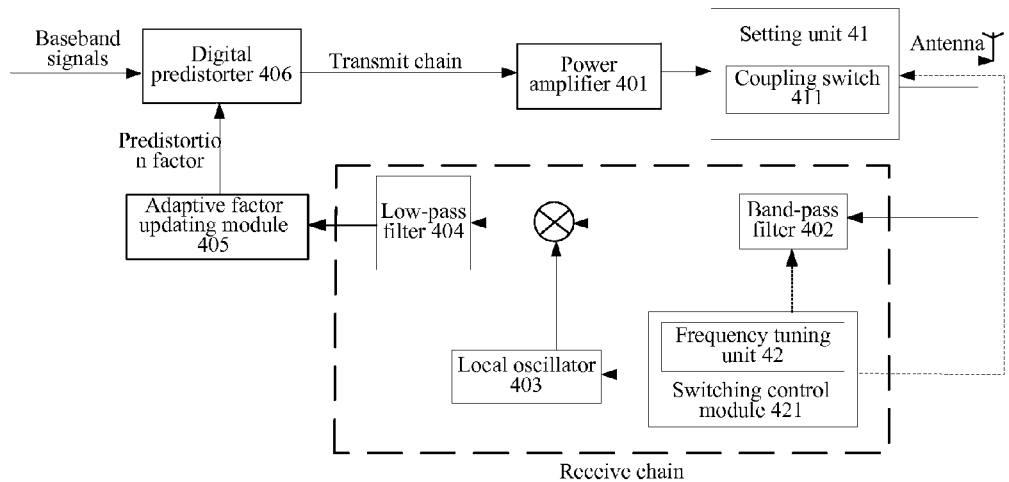
FIG. 5 is schematic flow chart of a digital predistortion processing method according to Embodiment 3.

Specifically, as shown in FIG. 5, original baseband signals sent by the user terminal are converted into radio frequency signals after traveling through a transmit chain and a power amplifier 401. A switching control module 421 may control the setting unit 41 to select the data collection mode as the working mode of the receive chain, that is, controlling a coupling switch 411 in the setting unit 41 to choose to send the radio frequency signals sent by the power amplifier 401 to the receive chain. Meanwhile, the switching control module 421 may control the frequency tuning unit 42 to tune the frequency of a local oscillator 403 and the central frequency of a band-pass filter 402 in the receive chain to the transmitting frequency of the user terminal. Partial interference signals of the radio frequency signals may be removed by the band-pass filter 402 whose central frequency is the transmitting frequency of the user terminal. Then the radio frequency signals can be converted into baseband signals after going through the effects of the local oscillator 403 whose frequency is the transmitting frequency of the user terminal and a low-pass filter 404. Then the baseband signals are sent to an adaptive factor updating module 405. The adaptive factor updating module 405 may calculate the predistortion factor according to the baseband signals and the original baseband signals sent by the user terminal, and send the predistortion factor to a digital predistorter 406, so that the digital predistorter performs the predistortion factor update.

The frequency tuning unit 42 is further configured to tune, when the control command is selecting the normal receiving mode as the working mode of the receive chain, the frequency of the local oscillator and the central frequency of the band-pass filter in the receive chain to the receiving frequency of the user terminal, so that the user terminal receives data.

Specifically, as shown in FIG. 5, after the predistortion factor update is complete, the switching control unit 421 may control the setting unit 41 to select the normal receiving mode as the working mode of the receive chain, that is, controlling the coupling switch 411 in the setting unit 41 to choose to send the radio frequency signals sent by the power amplifier 401 to an antenna. Meanwhile, the switching control module 421 may control the frequency tuning unit 42 to tune the frequency of the local oscillator 403 and the central frequency of the band-pass filter 402 in the receive chain to the receiving frequency of the user terminal, so that the user terminal receives data normally. The radio frequency signals sent by the power amplifier 401 have already gone through the predistortion processing performed by the digital predistorter 406 with an updated predistortion factor. That is, signals sent by the antenna have already gone through predistortion processing, so that the ACLRs of output signals meet the requirement in a 3GPP protocol.

The user terminal described in this embodiment may be a user terminal in a WCDMA system, a CDMA system, and a GSM system. For a TD-SCDMA system, the receive chain and the transmit chain of a user terminal use the same frequency, and therefore, when the receive chain enters the data collection mode, the frequency of the local oscillator and the central frequency of the band-pass filter in the receive chain are already the transmitting frequency of the user terminal, and do not need to be adjusted.

In this embodiment, a user terminal is provided to set a control command, and the user terminal tunes, when the control command is set into selecting a data collection mode as the working mode of a receive chain in a particular scenario, the frequency of a local oscillator and the central frequency of a band-pass filter in the receive chain to the transmitting frequency of the user terminal, so that the user terminal performs predistortion factor update. In this way, an existing receive chain of the user terminal may be used in the particular scenario to implement digital predistortion processing, thereby simplifying the structure of a digital predistortion apparatus and reducing the cost under the condition that current services of the user terminal are not affected.

Persons of ordinary skill in the art should understand that all or part of the steps of the methods in the embodiments may be implemented by a program instructing relevant hardware. The program may be stored in a computer readable storage medium. When the program runs, the above steps of the methods in the embodiments are performed. The storage medium may be any medium capable of storing program codes, such as a ROM, a RAM, a magnetic disk, or an optical disk, and the like.

The foregoing descriptions are merely exemplary embodiments of the present invention, but not intended to limit the protection scope of the present invention. Any variation or replacement that can be easily made by persons skilled in the art without departing from the technical scope disclosed by the present invention shall fall within the protection scope of the present invention. Therefore, the protection scope of the present invention shall be subject to the protection scope of the appended claims.

What is claimed is:

1. A user terminal, comprising:
   a transmit chain, configured to transmit a radio frequency signal which is converted from a first baseband signal originated in the user terminal, wherein the radio frequency signal has a transmitting frequency;
   a receive chain, configured to produce a second baseband signal or a third baseband signal;
   a setting unit, configured to set a control command for the receive chain, wherein the control command is selecting a data collection mode or a normal receiving mode;
   an adaptive factor updating module, coupled to output of the receive chain and configured to receive the second baseband signal and calculate a predistortion factor according to the first baseband signal and the second baseband signal; and
   a digital predistorter, configured to perform predistortion factor update by using the calculated predistortion factor, and perform predistortion by using an updated predistortion factor;
   wherein when the control command from the setting unit is selecting the data collection mode, the receive chain converts the radio frequency signal into the second baseband signal, and when the control command from the setting unit is selecting the normal receiving mode, the receive chain converts a received signal which has a receiving frequency from an antenna into the third baseband signal.

2. The user terminal according to claim 1, wherein the receive chain comprises:
   a band-pass filter;
   a local oscillator, coupled to the band-pass filter;
   a switching control module which includes a tuning unit, coupled to the local oscillator and the band-pass filter, and configured to tune a frequency of the local oscillator and a central frequency of the band-pass filter to the transmitting frequency when the control command is selecting the data collection mode, and tune the frequency of the local oscillator and the central frequency of the band-pass filter to the receiving frequency when the control command is selecting the normal receiving mode.

3. The user terminal according to claim 2, wherein the receive chain further comprises: a low-pass filter, coupled to output of the local oscillator and configured to obtain the second baseband signal or the third baseband signal.

4. The user terminal according to claim 1, wherein the setting unit is configured to set the control command into selecting the data collection mode after the user terminal is switched on and set the control command into selecting the normal receiving mode after the user terminal completes the predistortion factor update.

5. The user terminal according to claim 1, wherein the setting unit is configured to periodically set the control command into selecting the data collection mode when the receive chain is idle in a switched-on state, and set the control command into selecting the normal receiving mode after the user terminal completes the predistortion factor update.

6. The user terminal according to claim 1, wherein the switching control module is further configured to control the setting unit to select the data collection mode or the normal receiving mode.

7. The user terminal according to claim 1, wherein the user terminal further comprises: a power amplifier, coupled with output of the transmit chain and configured to amplify the radio frequency signal before the receive chain converts the radio frequency signal into the second baseband signal.

8. A digital predistortion processing in a user terminal, comprising:
   transmitting, by a transmit chain, a radio frequency signal which is converted from a first baseband signal originated in the user terminal, wherein the radio frequency signal has a transmitting frequency;
   setting a control command, wherein the control command is selecting a data collection mode or a normal receiving mode;
   converting, by a receive chain, the radio frequency signal into a second baseband signal when the control command is selecting the data collection mode;
   converting, by the receive chain, a received signal which has a receiving frequency from an antenna into a third baseband signal when the control command is selecting the normal receiving mode;
   calculating a predistortion factor according to the first baseband signal and the second baseband signal; and performing predistortion factor update by using the calculated predistortion factor, and performing predistortion by using an updated predistortion factor.

9. The method according to claim 8, wherein converting, by the receive chain, the radio frequency signal into the second baseband signal comprises: tuning a frequency of a local oscillator in the receive chain and a central frequency of a band-pass filter in the receive chain to the transmitting frequency; and converting, by the receive chain, the received signal which has the receiving frequency from the antenna into the third baseband signal comprises: tuning the frequency of the local oscillator and the central frequency of the band-pass filter to the receiving frequency.

10. The method according to claim 8, wherein setting the control command comprises:

setting the control command into selecting the data collection mode after the user terminal is switched on and setting the control command into selecting the normal receiving mode after the user terminal completes the predistortion factor update.

11. The method according to claim 8, wherein setting the control command comprises:

periodically setting the control command into selecting the data collection mode when the receive chain is idle in a switched-on state, and setting the control command into selecting the normal receiving mode after the user terminal completes the predistortion factor update.

12. The method according to claim 8, wherein after transmitting, by the transmit chain, the radio frequency signal, the method further comprises:

amplifying the radio frequency signal before the receive chain converts the radio frequency signal into the second baseband signal.

* * * * *